United States Patent
Inomata

(10) Patent No.: US 10,733,485 B2
(45) Date of Patent: Aug. 4, 2020

(54) WRITING PRESERVATION APPARATUS AND NON-TRANSITORY COMPUTER READABLE MEDIUM STORING WRITING PRESERVATION PROGRAM

(71) Applicant: FUJI XEROX CO., LTD., Tokyo (JP)

(72) Inventor: Kohshiro Inomata, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 166 days.

(21) Appl. No.: 15/805,144

(22) Filed: Nov. 7, 2017

(65) Prior Publication Data
US 2018/0276510 A1 Sep. 27, 2018

(30) Foreign Application Priority Data
Mar. 22, 2017 (JP) ................. 2017-055269

(51) Int. Cl.
G06K 9/78 (2006.01)
G06K 9/72 (2006.01)
G06K 9/20 (2006.01)
H04N 5/91 (2006.01)
G06K 9/62 (2006.01)
H04N 5/77 (2006.01)
(Continued)

(52) U.S. Cl.
CPC .......... *G06K 9/78* (2013.01); *G06K 9/00751* (2013.01); *G06K 9/2054* (2013.01); *G06K 9/6201* (2013.01); *G06K 9/72* (2013.01); *G06T 11/60* (2013.01); *H04N 5/77* (2013.01); *H04N 5/91* (2013.01)

(58) Field of Classification Search
None
See application file for complete search history.

(56) References Cited

U.S. PATENT DOCUMENTS

| 7,427,983 B1* | 9/2008 | Hildebrandt | ....... H04N 1/00127 178/18.01 |
| 2011/0141278 A1* | 6/2011 | Campbell | ............. G06F 3/0425 348/143 |

(Continued)

FOREIGN PATENT DOCUMENTS

JP   2004312436   11/2004

OTHER PUBLICATIONS

Real time whiteboard capture and processing using a video camera for remote collaboration, by He et al., IEEE Jan. 2007, (Year: 2007).*

*Primary Examiner* — Vikkram Bali
(74) *Attorney, Agent, or Firm* — JCIPRNET

(57) ABSTRACT

A writing preservation apparatus preserves, as image data, writing on a writing target medium in which writing is performed and erasing of writing in an arbitrary region is performed. The apparatus includes an acquisition unit that acquires time-series image data items at points of times for the writing target medium, a written region recognition unit that recognizes written regions in which writing is performed on the writing target medium at the points of time based on the image data items at the points of time which are acquired by the acquisition unit, and a preservation unit that preserves first image data at a first point of time in a case where the written region recognized based on the first image data in whole or part is absent in the written region recognized based on second image data at a second point of time subsequent to the first point of time.

5 Claims, 6 Drawing Sheets

(51) Int. Cl.
    *G06T 11/60*     (2006.01)
    *G06K 9/00*     (2006.01)

(56) References Cited

U.S. PATENT DOCUMENTS

2018/0040111 A1*   2/2018   Benet Ballester ...... G06T 5/005
2018/0232192 A1*   8/2018   Timoner ............... G06F 3/1446

* cited by examiner

WRITING PRESERVATION APPARATUS AND NON-TRANSITORY COMPUTER READABLE MEDIUM STORING WRITING PRESERVATION PROGRAM

CROSS-REFERENCE TO RELATED APPLICATIONS

This application is based on and claims priority under 35 USC 119 from Japanese Patent Application No. 2017-055269 filed Mar. 22, 2017.

BACKGROUND

(i) Technical Field

The invention relates to a writing preservation apparatus and a non-transitory computer readable medium storing a writing preservation program.

(ii) Related Art

For example, a presenter performs writing on a whiteboard and explains the written contents to participants in a meeting room of an office. In this case, there is a need for preservation of the writing on the whiteboard. Thus, a whiteboard having a function of copying the writing on paper is developed, and is commercially available.

However, in a case where such a copying function is used, the writing operation needs to be stopped during the copying operation.

In order to prevent a user from forgetting to copy the whiteboard, it is considered that the whiteboard is captured by a video camera or is repeatedly captured at predetermined intervals and the captured image items are preserved. In this case, it is possible to preserve the writing without missing without user's concern about the copying of the writing. However, in a case where the video capturing or the repeated capturing is performed, since the same writing is captured in duplicate several times, large memory capacity is required in order to preserve the captured images. After the video capturing or the repeated capturing is performed, in a case where the user attempts to check the writing, since the number of images to be checked is excessively larger than the amount of needed information recorded, it takes a long time to check the writing.

In addition to the whiteboard, there are such disadvantages in a case where a blackboard is used or a wall of a room is used instead of the white board or the blackboard. Such a whiteboard, blackboard, or the like is referred to as a "writing target medium".

SUMMARY

According to an aspect of the invention, there is provided a writing preservation apparatus that preserves, as image data, writing on a writing target medium on which writing is performed and erasing of writing in an arbitrary region is performed. The apparatus includes an acquisition unit that acquires time-series image data items at points of times for the writing target medium, a written region recognition unit that recognizes written regions in which writing is performed on the writing target medium at the points of time based on the image data items at the points of time which are acquired by the acquisition unit, and a preservation unit that preserves first image data at a first point of time in a case where the written region recognized based on the first image data in whole or in part is absent in the written region recognized based on second image data at a second point of time subsequent to the first point of time.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the invention will be described.

Figure 1:
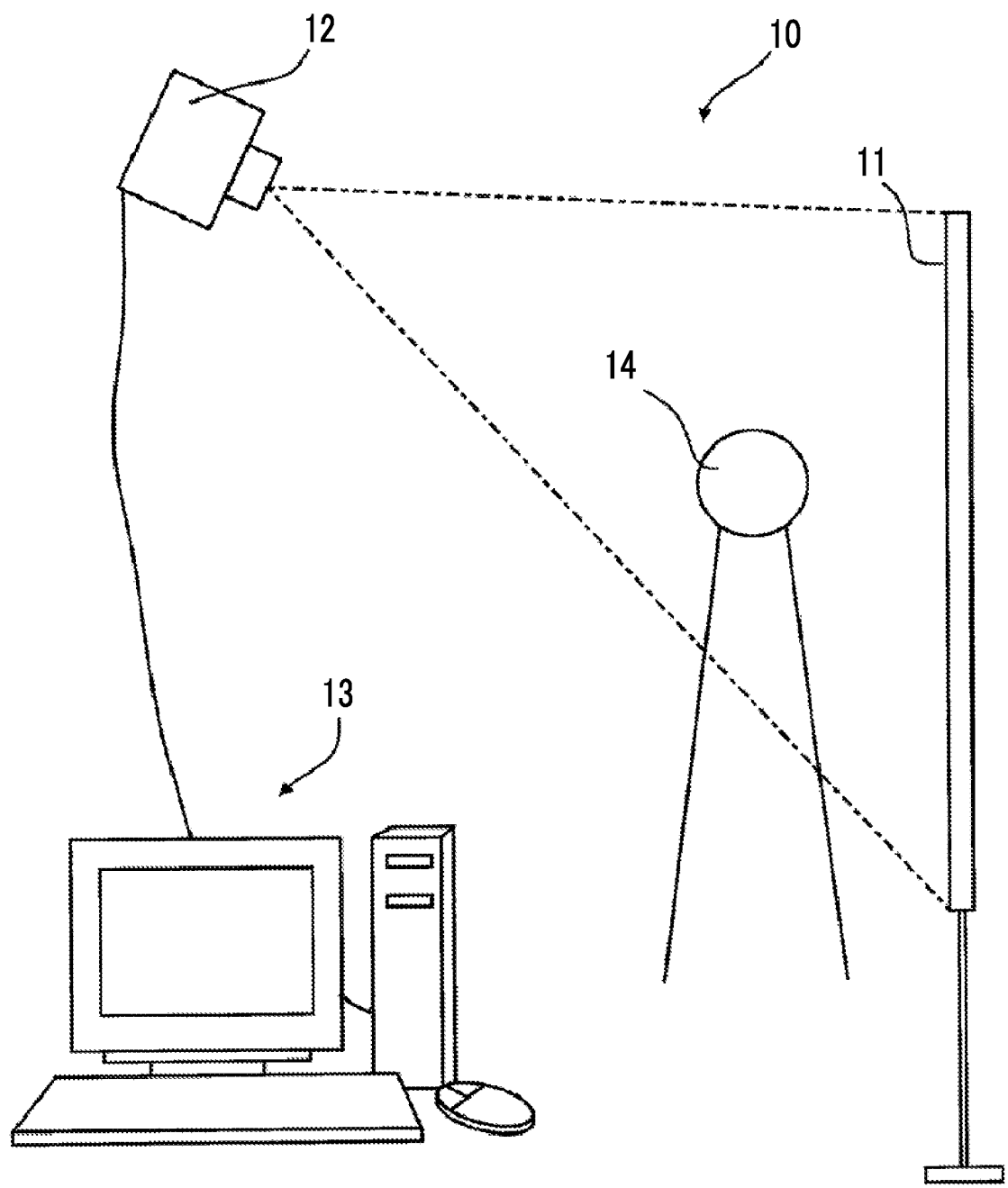
FIG. 1 is a schematic diagram of a whiteboard capturing system.

FIG. 1 is a schematic diagram of a whiteboard capturing system.

The whiteboard capturing system 10 includes a whiteboard 11, a camera 12, and a personal computer (hereinafter, abbreviates to a "computer") 13.

A user 14 performs writing on the whiteboard 11. For example, the user 14 stands in front of the whiteboard 11, and performs writing on the whiteboard 11. Thereafter, the user moves to the side of the whiteboard 11, and explains the contents written on the whiteboard 11. In a case where the writing on the whiteboard 11 is full or the user ends the explaining even though the writing on the whiteboard is not full, the user erases the writing in whole or part. The user continues the explaining while repeating the writing and erasing. The whiteboard 11 corresponds to an example of a writing target medium of the invention in which writing is performed and erasing of writing in an arbitrary region is performed.

The camera 12 is provided on a wall of a room or the like, and repeatedly captures the whiteboard 11 at predetermined time intervals (for example, an interval of 5 seconds, an interval of 10 seconds, or the like). Image data items acquired through the repeated capturing are input to the computer 13.

Figure 2:
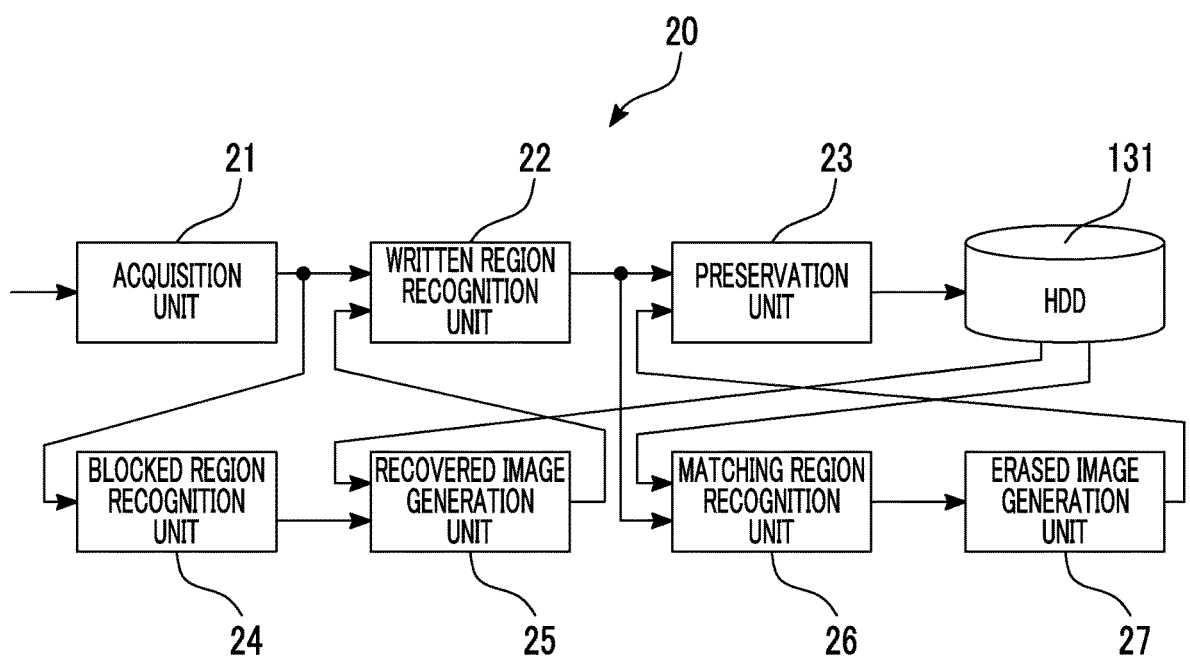
FIG. 2 is a functional block diagram of a writing preservation apparatus as one exemplary embodiment of the invention.

FIG. 2 is a functional block diagram of a writing preservation apparatus as one exemplary embodiment of the invention.

A writing preservation program (see FIG. 6) as one exemplary embodiment of the invention is executed within the computer 13 shown in FIG. 2. The computer 13 functions as a writing preservation apparatus 20 shown in FIG. 2 as one exemplary embodiment of the invention by executing the writing preservation program.

A specific example will be described below, and the writing preservation apparatus 20 will be generally described now.

The writing preservation apparatus shown in FIG. 2 is a writing preservation apparatus that preserves, as image data, writing on the whiteboard 11 shown in FIG. 1 and includes an acquisition unit 21, a written region recognition unit 22, and a preservation unit 23.

The acquisition unit 21 acquires time-series image data items at points of time for the writing on the whiteboard 11, which are acquired through the capturing in the camera 12.

The written region recognition unit 22 recognizes written regions in which the writing is performed on the whiteboard 11 at the points of time based on the image data items at the points of time which are acquired by the acquisition unit 21.

In a case where a written region recognized based on first image data at a first point of time in whole or part is absent in a written region recognized based on second image data at a second point of time subsequent to the first point of time, the preservation unit 23 preserves the first image data at the first point of time in a HDD 131. The HDD 131 is a hard disk drive, and is a data storage device that is built in the computer 13.

In this example, in a case where an absent area in which the written region recognized based on the second image data is absent in the written region recognized based on the first image data extends over a predetermined threshold, the preservation unit 23 preserves the first image data.

The writing preservation apparatus 20 shown in FIG. 2 includes a blocked region recognition unit 24 and a recovered image generation unit 25.

The blocked region recognition unit 24 recognizes whether or not a blocked region in which an obstruction (for example, person or arm) which blocks a part of the whiteboard 11 is pictured is present on an image represented by the image data acquired by the acquisition unit 21.

The recovered image generation unit 25 generates fifth image data representing a fifth image which is acquired by recovering at least a part of writing in the blocked region at a third point of time instead of a third image represented by third image data based on the third image data at the third point of time on which the presence of the blocked region on the image is recognized and fourth image data items at one or more fourth points of time which are earlier than the third point of time.

In a case where the presence of the blocked regions is recognized, the written region recognition unit 22 recognizes the written region at the third point of time based on the fifth image data generated by the recovered image generation unit 25.

The writing preservation apparatus 20 shown in FIG. 2 includes a matching region recognition unit 26 and an erased image generation unit 27.

In a case where at least a part of the written region recognized based on the first image data is absent in the written region recognized based on the second image data at the second point of time, the matching region recognition unit 26 compares the first image data with sixth image data preserved in the HDD 131 in the previous stage by the preservation unit 23, and recognizes whether or not a matching region in which the writing matches each other between these image data items is present.

In a case where the presence of the matching region is recognized, the erased image generation unit 27 generates seventh image data representing a seventh image acquired by erasing a partial image of the matching region from the first image represented by the first image data.

In a case where the presence of the matching region is recognized, the preservation unit 23 preserves the seventh image data acquired by erasing the partial image of the matching region instead of the first image data.

Hereinafter, a specific example of an operation of the writing preservation apparatus 20 will be described. In the following description, image data and an image represented by this image data may be referred to as an "image" without particularly distinguishing between them.

Figure 3:
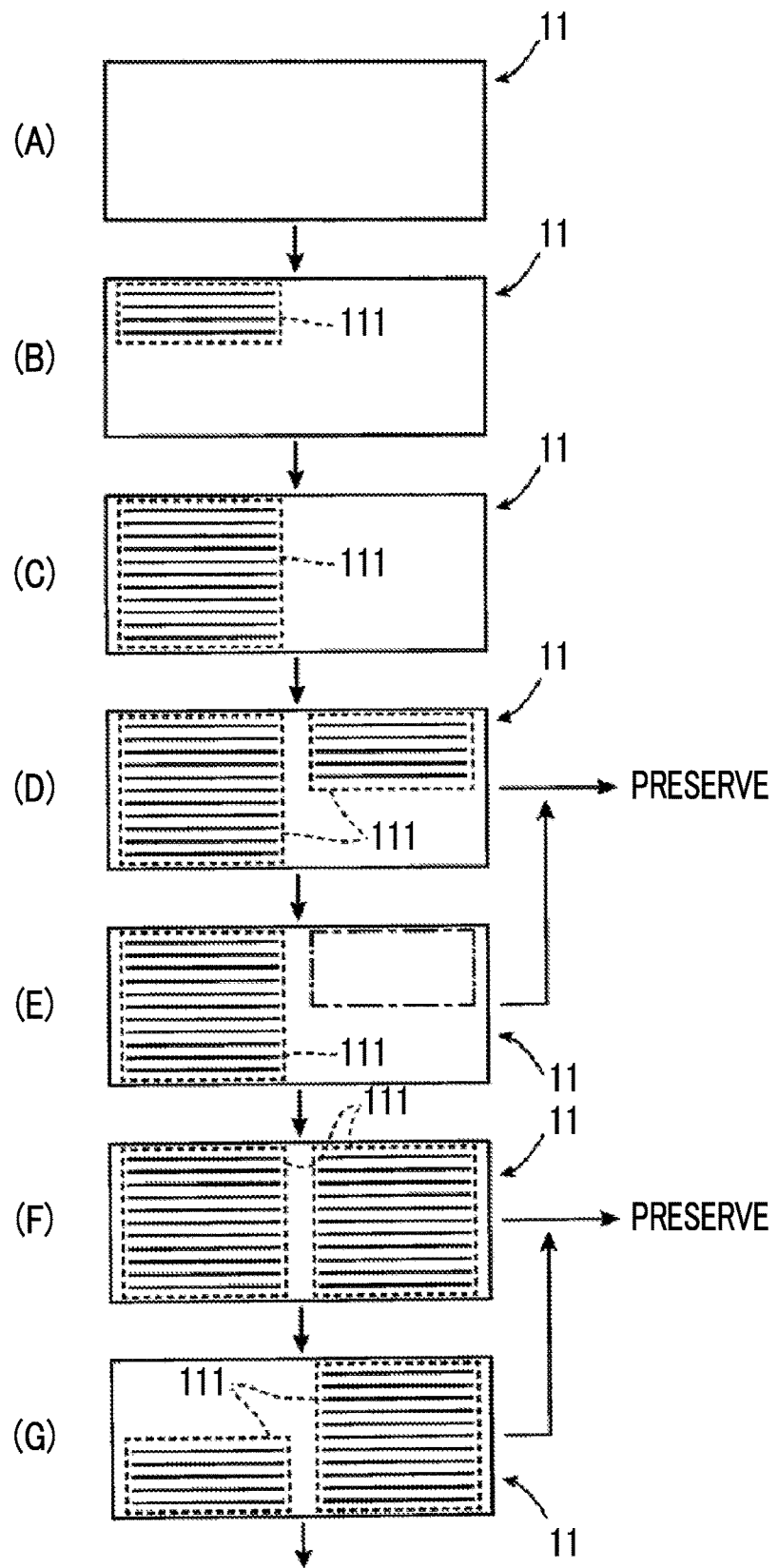
FIG. 3 is a schematic diagram showing a basic operation of the writing preservation apparatus shown in FIG. 2.

FIG. 3 is a schematic diagram showing a basic operation of the writing preservation apparatus shown in FIG. 2.

Parts (A) to (G) in FIG. 3 show images of the whiteboard 11 which are acquired through the capturing in the camera 12 in a sequence of time.

The part (A) in FIG. 3 is an image of the whiteboard 11 in a blank state on which writing is not performed yet.

In the part (B) in FIG. 3, a written region ill is pictured in an upper left corner of the whiteboard 11.

In the part (C) in FIG. 3, the written region 111 extends over the whole left half of the whiteboard 11.

In the part (D) in FIG. 3, the written region 111 extends over an upper half on the right side in addition to the whole left half of the whiteboard 11.

In the part (E) in FIG. 3, the writing in the upper half on the right side of the whiteboard 11 is erased, and the written region 111 remains in the whole left half.

In the part (F) in FIG. 3, writing is performed in the whole right half while the writing remains in the whole left half of the whiteboard 11 in the part (E) in FIG. 3, and the written region 111 extends over the whole whiteboard 11.

In the part (G) in FIG. 3, the writing in the upper half on the left side of the whiteboard 11 is erased, and the written region extends over the lower half on the left side and the whole region on the right side of the whiteboard 11.

For example, the acquisition unit 21 of FIG. 2 sequentially acquires the time-series images as shown in FIG. 3. The written region recognition unit 22 recognizes the written regions 111 shown in FIG. 3 from the images acquired by the acquisition unit 21. The preservation unit 23 compares the image at the current point of time (second point of time) with the image at the previous point of time (first point of time) which is earlier than the image at the current point of point (second point of time), and preserves the image at the previous point of time (first point of time) in a case where the written region 111 extended over in the image at the previous point of time (first point of time) in whole or part is absent in the image at the current point of time (second point of time). In this example, the written region 111 is absent in the part (E) in FIG. 3 and the part (G) in FIG. 3. Accordingly, the images of the part (D) in FIG. 3 and the part (F) in FIG. 3 are preserved in this example. For example, in the present exemplary embodiment, the image is not preserved in a case where the absent area in the written region is small, such as a case where capturing is performed at a point of time when one character is written and the next capturing is performed at a point of time when the one character is erased for correction, and the image is preserved in a case where the absent area in the written region extends over a predetermined threshold.

Figure 4:
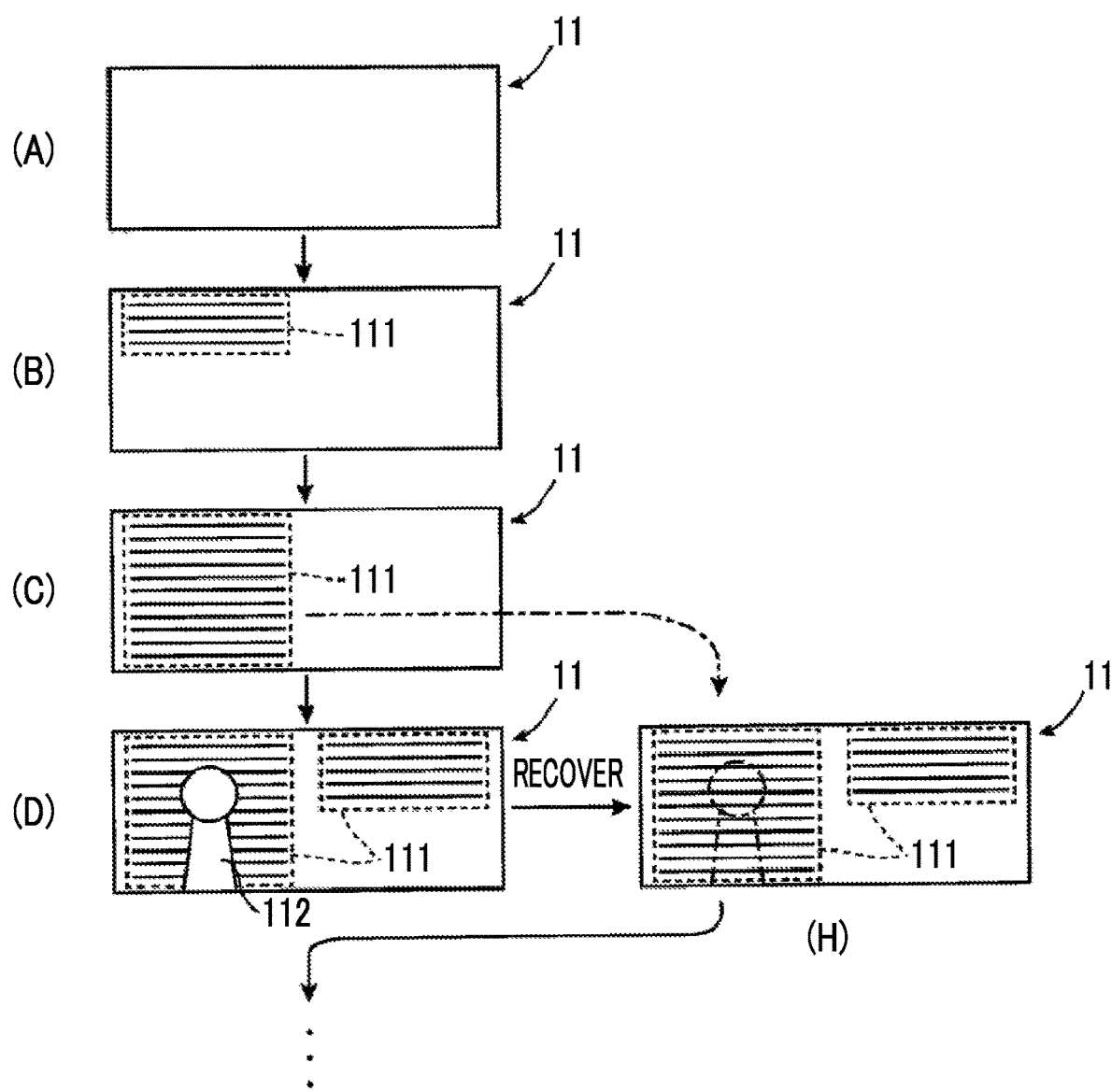
FIG. 4 is an explanatory diagram of actions of a blocked region recognition unit and a recovered image generation unit of the writing preservation apparatus shown in FIG. 2.

FIG. 4 is an explanatory diagram of the actions of the blocked region recognition unit and the recovered image generation unit of the writing preservation apparatus shown in FIG. 2.

Similarly to FIG. 3, the captured images are also shown in a sequence of time in FIG. 4. A part (H) in FIG. 4 shows a processed image at the same point of time as that of the part (D) in FIG. 3.

Parts (A) to (C) in FIG. 4 are the same as the parts (A) to (C) in FIG. 3, and thus, the description thereof will be omitted.

A person who stands in front of the whiteboard 11 is pictured in a part (D) in FIG. 4. Thus, a portion of the writing on the whiteboard 11 which is shadowed by the person who stands in front of the whiteboard is missing.

As stated above, in a case where a person or an arm is pictured so as to block a part of the whiteboard 11, an image of a region (in this example, this region is referred to as a blocked region 112) in which this person or arm is pictured is erased from the image of the part (D) in FIG. 4. A partial image of the region corresponding to the blocked region is cut from the image which is acquired through the capturing at the point of time earlier than that in the part (D) in FIG. 4 and on which the writing in the region corresponding to the blocked region 112 is pictured. The cut partial image is fit to a region of the part (D) in FIG. 4 in which the blocked region 112 is erased, and an image acquired by recovering the writing in the blocked region 112 is generated as shown in the part (H) in FIG. 4. Instead of the image of the part (D) in FIG. 4, the written region 111 is recognized for the image at the point of time of the part (D) in FIG. 4 based on the image of the part (H) in FIG. 4 acquired by recovering the writing in the blocked region 112.

It has been described in this example that the writing in the blocked region 112 is recovered based on one image as shown in the part (C) in FIG. 4. However, for example, in a case where the position of the person who stands in front of the whiteboard 11 is slightly shifted in the image at the previous point of time shown in the part (C) in FIG. 4 and only the writing in a partial region of the blocked region 112 is pictured on the image of the part (C) in FIG. 4, the writing in the blocked region 112 may be recovered by cutting and pasting images little by little based on plural images captured at plural points of time which is earlier than that of the part (D) in FIG. 4.

It has been described in this example that the whole contour of the person pictured on the image of the part (D) in FIG. 4 is extracted. However, for example, in a case where a white shirt and the whiteboard 11 are not able to be easily distinguished and the whole contour of the person is not able to be extracted, a slightly large rectangular region may be set such that the whole person is enclosed based on, for example, the extracted head, and the rectangular region may be used as the blocked region 112. Even though the whole contour of the person is extracted, the extracted contour may be slightly enlarged, and a boundary region between the person and the whiteboard 11 may be included in the blocked region 112.

Figure 5:
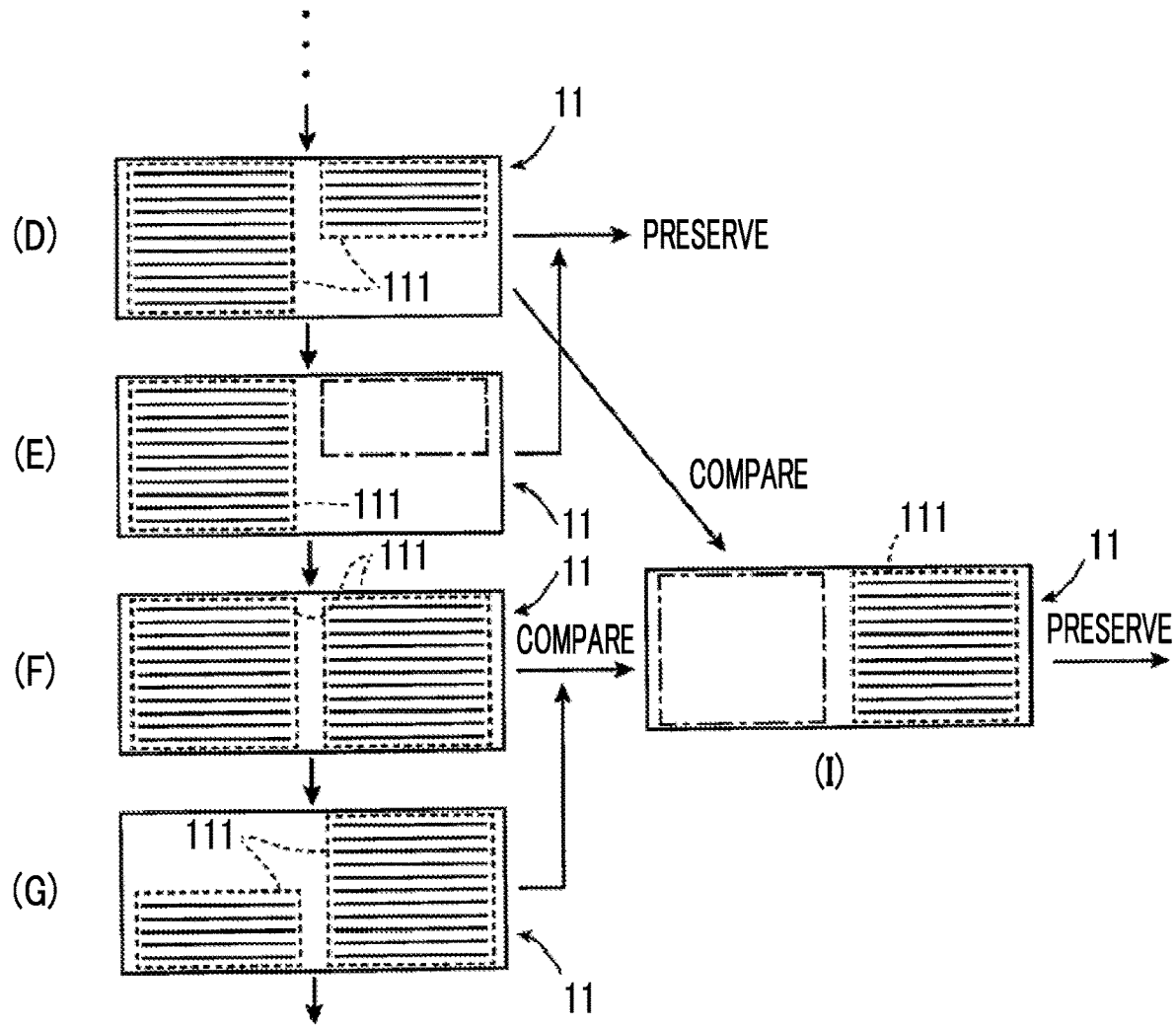
FIG. 5 is an explanatory diagram of actions of a matching region recognition unit and an erased image generation unit of the writing preservation apparatus shown in FIG. 2.

FIG. 5 is an explanatory diagram of the actions of the matching region recognition unit and the erased image generation unit of the writing preservation apparatus shown in FIG. 2.

Similarly to FIG. 3, the captured images are also shown in a sequence of time in FIG. 5. A part (I) in FIG. 5 shows a processed image at the same point of time as that of a part (F) in FIG. 5.

In FIG. 5, parts (D) to (G) in FIG. 5 are the same as the parts (D) to (G) in FIG. 3, and thus, the redundant description for the images will be omitted. The parts (A) to (C) in FIG. 5 are the same as the parts (A) to (C) in FIG. 3, and thus, the description is given in the order of the part (A) in FIG. 3-4 the part (B) in FIG. 3-4 the part (C) in FIG. 3-4 the part (D) in FIG. 5 (the part (D) in FIG. 3).

The image of the part (D) in FIG. 5 (the part (D) in FIG. 3) is preserved as described in FIG. 3.

In the basic operation described in FIG. 3, the image of the part (F) in FIG. 3 is also preserved. In this example, the image of the part (F) in FIG. 5 is not preserved as it is, the image of the part (F) in FIG. 5 is compared with the image of the part (D) in FIG. 5 preserved at the one previous stage, and the matching region in which the writing matches each other between these image data items is recognized. In the example shown in FIG. 5, the writing in the left half of the written region of the whiteboard 11 matches each other between the part (D) in FIG. 5 and the part (F) in FIG. 5. Thus, an image shown in the part (I) in FIG. 5 acquired by erasing a partial image of the matching region from the image of the part (F) in FIG. 5 is generated, and the image of the part (I) in FIG. 5 is preserved instead of the image of the part (F) in FIG. 5. By doing this, the number of times the same writing is preserved in duplicate is reduced. Accordingly, it is possible to further save storage capacity, and it is possible to more conveniently review the writing on the whiteboard 11.

Figure 6:
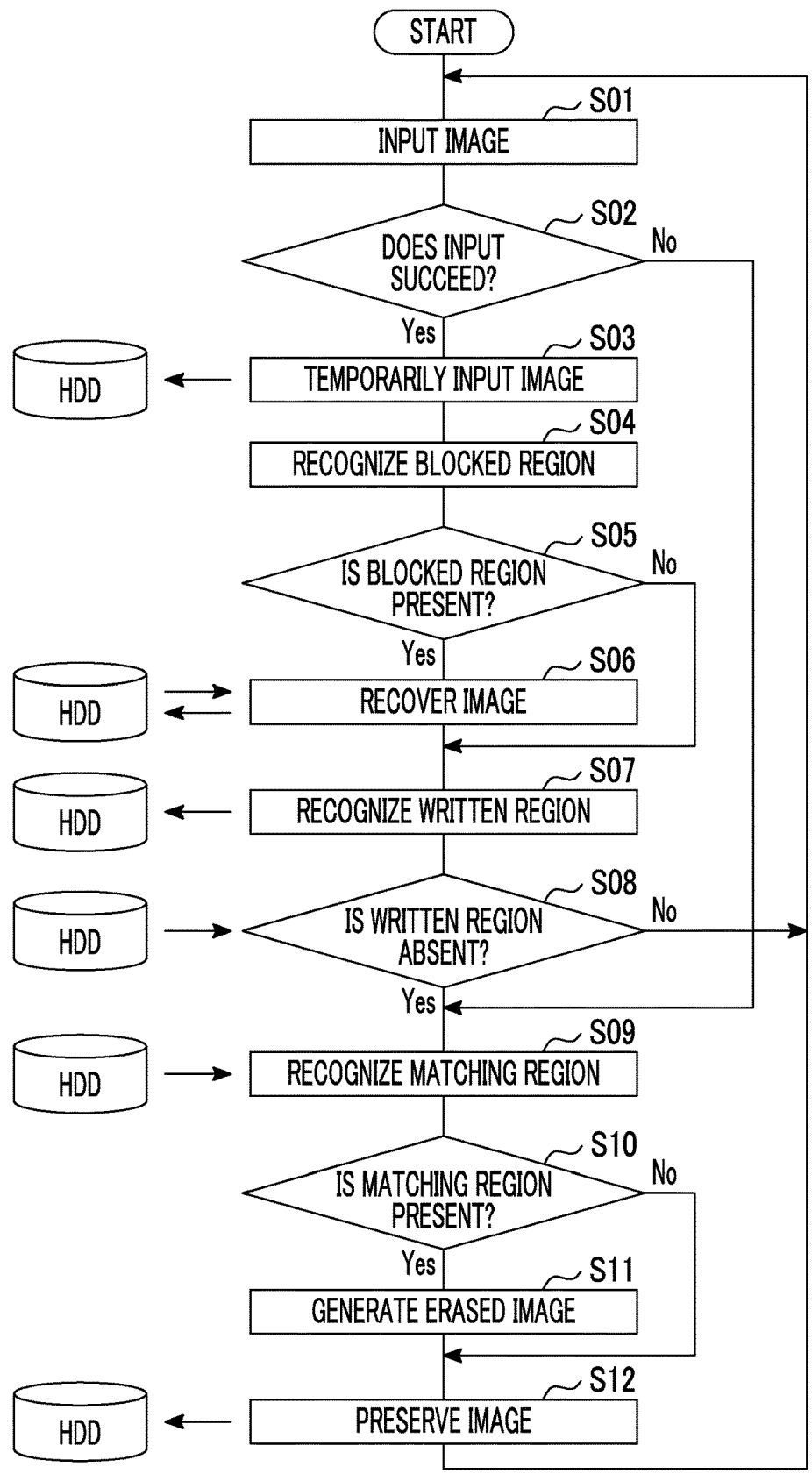
FIG. 6 is a diagram showing a flowchart of a writing preservation program as one exemplary embodiment of the invention.

FIG. 6 is a diagram showing a flowchart of the writing preservation program as one exemplary embodiment of the invention. The writing preservation program is executed in the computer 13 (see FIG. 1), and thus, the computer 13 operates as the writing preservation apparatus shown in FIG. 2.

In this example, one image acquired through the capturing in the camera 12 is input (step S01), and it is determined whether or not this input succeeds (step S02). A case where the input fails will be described below, and it is assumed that the input succeeds in this example. The input image is temporarily preserved in the HDD 131 (step S03). In this example, there is a concern that the positions of the images acquired through the capturing will be very slightly shifted from one another. In a case where the image is temporarily preserved, this image is preserved after the positions of this image and the image temporarily preserved in the previous stage are adjusted as pre-processing.

Subsequently, a blocked region recognition process is performed (step S04). The blocked region recognition process is a process of recognizing the region (blocked region 112) of the whiteboard 11 which is hidden by the person or arm as shown in the part (D) in FIG. 4. In this process, thin lines written on the whiteboard 11 are ignored, and the presence of a large mass on the image is recognized. The movement of the large mass may be caught by comparing this image with the previous image of this image, and the blocked region 112 may be recognized by referring to this movement. In this example, in a case where the blocked region recognition process is performed, a low-resolution image is generated, and a large mass on the low-resolution image is recognized by performing thresholding on this image. Thereafter, the whole contour of the large mass is slightly enlarged, and the enlarged region is recognized as the blocked region 112. Alternatively, a simple rectangular region including the large mass may be used as the blocked region 112, for example.

In a case where the blocked region 112 is present (step S05), the process of recovering the writing in the blocked region 112 is performed by using the image acquired at the previous point of time earlier than the image acquired at the current point of time (step S06). In a case where the recovering process is performed, the image on which the recovering process is performed is temporarily preserved in the HDD 131 instead of the image at the current point of time which is temporarily preserved.

Subsequently, a written region recognition process is performed (step S07). In the written region recognition process, the written region 111 shown in FIG. 3 is recognized for the image acquired at the current point of time, for example. In a case where the blocked region is present and the recovering process (step S06) is performed, the written region recognition process (step S07) is performed on the image on which the recovering process is performed instead of the image acquired at the current point of time. The written region recognized through the written region recognition process is temporarily preserved in the HDD 131 in association with the recognizing target image.

The written region of the image at the current point of time (the image on which the recovering process is performed in a case where the recovering process is performed) and the written region of the image which is acquired at the previous point of time and is temporarily preserved in the HDD 131 are compared with each other, and it is determined whether or not an absent area which is wider than that of the written region of the image at the previous point of time and extends over a threshold is present in the written region of the image at the current point of time (step S08). In a case where the absent area which extends over the threshold is not present, the next image is input (step S01).

In a case where the absent area which extends over the threshold is present in the written region, a matching region recognition process is subsequently performed (step S9). In the matching region recognition process, the image (alternatively, the image on which the recovering process is performed in a case where the recovering process is performed on the image acquired at the first point of time) (for example, the image of the part (F) in FIG. 5) which is acquired at the previous point of time (first point of time) and is temporarily preserved in the HDD 131 instead of the image acquired at the current point of time (second point of time) is compared with the image (for example, the image of the part (D) in FIG. 5) recently preserved among the images which are not temporarily preserved and are formally preserved in the HDD 131 in step S12, and the matching region in which the writing matches each other is recognized on these two images. When the matching region is present (step S10), the erasure image (see the part (I) in FIG. 5) acquired by erasing the partial image of the matching region from the image at the previous point of time (first point of time) is generated (step S11). The erasure image is preserved in the HDD 131 (step S12). When the matching region is not present (step S10), the image at the first point of time is preserved.

In this example, there is a possibility that the camera 12 will be powered off before the execution of the writing preservation program shown in FIG. 6 is stopped in the computer 13. In this case, the image is not able to be input, and it is determined that the input fails in step S02. Thus, the process proceeds to step S09. The processes subsequent to step S09 are as described above. That is, the image input at the current stage is not processed, and the image which is input in the previous stage and is temporarily preserved is processed. It is assumed that the writing is performed on the whiteboard 11 and the camera is powered off before the writing is erased. In this case, in a case where the determination of step S02 is not performed, there is a concern that the last writing on the whiteboard 11 will not be preserved. Thus, it is considered that the input of the image fails, and the image at the previous point of time is preserved. In a case where the writing preservation program is continuously executed after the camera 12 is powered off, the input of the image continuously fails. However, since the input of the image at the previous point of time also fails in this case, the image at the previous point of time is also not present, and the image is not preserved.

Although it has been described in this example that the present invention is applied to the whiteboard capturing system shown in FIG. 1, the present invention may be widely applied to a case where writing on a writing target medium in which writing is performed and erasing of writing in an arbitrary region is performed is preserved as image data.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A writing preservation apparatus that preserves, as image data, writing on a writing target medium on which writing is performed and erasing of writing in an arbitrary region is performed, the apparatus comprising:
    a processor, configured to load instructions from a memory and execute the instructions to:
    acquire time-series image data captured at a plurality of points of times for the writing target medium;
    recognize written regions in which writing is performed on the writing target medium at the points of time based on the image data at the points of time which are acquired;
    preserve first image data captured at a first point of time in a case where the written region recognized in the first image data in whole or in part is absent in the written region recognized in second image data captured at a second point of time subsequent to the first point of time,
    recognize whether or not a blocked region in which an obstruction which blocks a part of the writing target medium is pictured is present on an image represented by the image data acquired; and
    generate fifth image data representing a fifth image which is acquired by recovering at least a part of writing in the blocked region captured at a third point of time, based on third image data captured at the third point of time on which presence of the blocked region on an image is recognized and fourth image data captured at one or more fourth points of time which are earlier than the third point of time,
    wherein the processor recognizes the written region captured at the third point of time in the fifth image data.

2. The writing preservation apparatus according to claim 1,
    wherein the processor preserves the first image data in a case where an absent area in which the written region recognized in the second image data is absent in the written region recognized in the first image data extends over a predetermined threshold.

3. The writing preservation apparatus according to claim 2, wherein the processor further executes instructions to:
    compare the first image data with sixth image data preserved in a previous stage in a case where at least a part of the written region recognized in the first image data is absent in the written region recognized in the second image data captured at the second point of time, and recognizes whether or not a matching region in which writing matches each other is present between the image data; and generate seventh image data representing a seventh image acquired by erasing a partial image of the matching region from a first image represented by the first image data in a case where the presence of the matching region is recognized, wherein the processor preserves the seventh image data instead of the first image data in a case where the presence of the matching region is recognized.

4. The writing preservation apparatus according to claim 1, wherein the processor further execute instructions to:

compare the first image data with sixth image data preserved in a previous stage in a case where at least a part of the written region recognized in the first image data is absent in the written region recognized in the second image data captured at the second point of time, and recognizes whether or not a matching region in which writing matches each other is present between the image data; and generate seventh image data representing a seventh image acquired by erasing a partial image of the matching region from a first image represented by the first image data in a case where the presence of the matching region is recognized, wherein the processor preserves the seventh image data instead of the first image data in a case where the presence of the matching region is recognized.

5. A non-transitory computer readable medium storing a writing preservation program that is executed in an information processing apparatus which executes a program, the program causing the information processing apparatus to operate as:

a writing preservation apparatus that stores, as image data, writing on a writing target medium in which writing is performed and erasing of writing in an arbitrary region is performed, wherein the writing preservation apparatus includes a processor, configured to load instructions from a memory and execute the instructions to:

acquire time-series image data captured at a plurality of points of times for the writing target medium;

recognize written regions in which writing is performed on the writing target medium at the points of time based on the image data at the points of time which are acquired;

preserve first image data captured at a first point of time in a case where the written region recognized in the first image data in whole or in part is absent in the written region recognized in second image data captured at a second point of time subsequent to the first point of time;

recognize whether or not a blocked region in which an obstruction which blocks a part of the writing target medium is pictured is present on an image represented by the image data acquired; and generate fifth image data representing a fifth image which is acquired by recovering at least a part of writing in the blocked region captured at a third point of time, based on third image data captured at the third point of time on which presence of the blocked region on an image is recognized and fourth image data captured at one or more fourth points of time which are earlier than the third point of time, wherein the processor recognizes the written region captured at the third point of time in the fifth image data.

* * * * *